(12) United States Patent
Nakamoto

(10) Patent No.: US 9,284,653 B2
(45) Date of Patent: Mar. 15, 2016

(54) FINE BUBBLE ELECTROLYZED WATER GENERATING APPARATUS AND METHOD FOR GENERATING FINE BUBBLE ELECTROLYZED WATER

(71) Applicant: TECH CORPORATION CO., LTD, Hiroshima (JP)

(72) Inventor: Yoshinori Nakamoto, Hiroshima (JP)

(73) Assignee: Tech Corporation Co., Ltd., Hiroshima (JP)

( * ) Notice: Subject to any disclaimer, the term of this patent is extended or adjusted under 35 U.S.C. 154(b) by 0 days.

(21) Appl. No.: 14/127,312

(22) PCT Filed: May 24, 2013

(86) PCT No.: PCT/JP2013/003297
§ 371 (c)(1),
(2) Date: Dec. 18, 2013

(87) PCT Pub. No.: WO2013/175800
PCT Pub. Date: Nov. 28, 2013

(65) Prior Publication Data
US 2014/0116889 A1  May 1, 2014

(30) Foreign Application Priority Data

May 24, 2012 (JP) .................. 2012-118979
Mar. 5, 2013 (JP) .................. 2013-043350

(51) Int. Cl.
| | |
|---|---|
| C02F 1/46 | (2006.01) |
| C25B 9/08 | (2006.01) |
| C02F 1/461 | (2006.01) |
| C25B 1/00 | (2006.01) |
| C25B 1/26 | (2006.01) |
| B08B 3/08 | (2006.01) |
| C02F 1/467 | (2006.01) |

(52) U.S. Cl.
CPC ............... *C25B 9/08* (2013.01); *C02F 1/4618* (2013.01); *C25B 1/00* (2013.01); *C25B 1/26* (2013.01);

(Continued)

(58) Field of Classification Search
USPC ................... 204/252, 266, 278; 205/701, 742
See application file for complete search history.

(56) References Cited

U.S. PATENT DOCUMENTS

| | | | | |
|---|---|---|---|---|
| 2006/0054205 A1* | 3/2006 | Yabe et al. | ................. | 134/184 |
| 2006/0169575 A1* | 8/2006 | Sumita | ................. | 204/164 |

FOREIGN PATENT DOCUMENTS

| | | |
|---|---|---|
| JP | 2003-251353 | 9/2003 |
| JP | 2004-121962 | 4/2004 |

(Continued)

OTHER PUBLICATIONS

International Search Report (ISR) issued Jul. 9, 2013 in International (PCT) Application No. PCT/JP2013/003297.

(Continued)

*Primary Examiner* — Arun S Phasge
(74) *Attorney, Agent, or Firm* — Wenderoth, Lind & Ponack, L.L.P.

(57) ABSTRACT

Electrolyzed water containing chlorine gas and hydrogen gas is provided, wherein the electrolyzed water has improved storage stability and provides satisfactory cleaning efficiency. In a fine bubble electrolyzed water generating apparatus and a method for generating fine bubble electrolyzed water, an electrolytic apparatus having a three-chamber structure is provided including an anode chamber with an anode electrode, a cathode chamber with a cathode electrode, an intermediate chamber, and diaphragms and provided between the intermediate chamber and each of the anode chamber and the cathode chamber. An acidic electrolyzed water storage tank and an alkaline electrolyzed water storage tank ii are provided adjacent to the apparatus. The respective storage tanks are in communication with the anode chamber and the cathode chamber through pipes. The respective storage tanks are in communication with nanobubble generators. The generators generate chlorine gas and nanobubble electrolyzed water with chlorine gas and acidic electrolyzed water produced in the anode chamber and generate hydrogen nanobubble electrolyzed water with hydrogen gas and alkaline electrolyzed water produced in the cathode chamber.

8 Claims, 5 Drawing Sheets

(52) U.S. Cl.
CPC ............... *B08B 3/08* (2013.01); *C02F 1/4674* (2013.01); *C02F 2001/4619* (2013.01); *C02F 2001/46185* (2013.01); *C02F 2201/46115* (2013.01)

(56) References Cited

FOREIGN PATENT DOCUMENTS

| | | |
|---|---|---|
| JP | 2007-105728 | 4/2007 |
| JP | 2007-209546 | 8/2007 |
| JP | 2010-279900 | 12/2010 |
| JP | 2012-96203 | 5/2012 |
| JP | 2013-10758 | 1/2013 |
| JP | 2013-17963 | 1/2013 |
| WO | 2007/004274 | 1/2007 |

OTHER PUBLICATIONS

English translation of the International Preliminary Report on Patentability issued Dec. 4, 2014 in International (PCT) Application No. PCT/JP2013/003297.

* cited by examiner

CARBON BLACK/MINERAL OIL

NUMBER OF GENERAL VIABLE BACTERIA
FOR EACH TREATMENT OF LETTUCE (a)

(b)

NO TREATMENT, 100 FOLD DILUTION (c)

TAP WATER, 100 FOLD DILUTION (d)

ACIDIC ELECTROLYZED
WATER, 10 FOLD DILUTION (e)

NB ACIDIC ELECTROLYZED WATER,
10 FOLD DILUTION

FINE BUBBLE ELECTROLYZED WATER GENERATING APPARATUS AND METHOD FOR GENERATING FINE BUBBLE ELECTROLYZED WATER

TECHNICAL FIELD

The present invention relates to a fine bubble electrolyzed water generating apparatus and a method for generating fine bubble electrolyzed water, and more particularly to a fine bubble electrolyzed water generating apparatus and a method for generating fine bubble electrolyzed water, wherein electrolyzed water and gas that are generated by electrolysis are used to provide alkaline electrolyzed nanobubble water most suitable for use in the overall cleaning field, particularly, in the cleaning of industrial parts and commercial cleaning, and acidic electrolyzed nanobubble water suitable for use in commercial cleaning.

BACKGROUND ART

Conventional electrolysis of brine includes the following reaction (1) on the anode side (anode chamber) and the following reactions (2), (3), and (4) on the cathode side (cathode chamber).

$$2Cl^- - 2e^- \rightarrow Cl_2 \quad (1)$$

$$2Na^+ + 2e^- \rightarrow 2Na \quad (2)$$

$$2Na + 2H_2O \rightarrow 2Na^+ + H_2 + 2OH^- \quad (3)$$

$$2H_2O + 2e^- \rightarrow H_2 + 2OH^- \quad (4)$$

Alkaline reducing cathode electrolyzed water is accordingly obtained in the cathode chamber.

Hydrogen gas is produced along with this cathode electrolyzed water. However, hydrogen gas, which has low solubility, has been released into the air without being dissolved in cathode electrolyzed water. Acidic anode electrolyzed water and chlorine gas are also obtained in the anode chamber.

Patent Literature 1 has been known as a technique of effectively utilizing chlorine gas produced along with anode electrolyzed water.

Patent Literature 1 has disclosed that an aqueous solution of an electrolyte, a mixture of caustic soda and table salt, was electrolyzed and the obtained electrolyzed solution was used as water for washing and cleaning.

CITATION LIST

Patent Literature

Patent Literature 1: JP2003-251353

SUMMARY OF INVENTION

Technical Problem

In the method of Patent Literature 1, however, chlorine gas included in the obtained electrolyzed water easily volatilized, causing low storage stability. When the electrolyzed water was used as water for washing and cleaning, satisfactory cleaning efficiency was not obtained accordingly.

In order to solve the problem, the present invention provides electrolyzed water that achieves satisfactory cleaning efficiency.

The present inventors have earnestly studied and as a result, have found that the above problem can be solved by forming nanobubbles of gas produced by electrolysis of an aqueous solution of sodium chloride, thereby completing the present invention.

Solution to Problem

The present invention relates to a fine bubble electrolyzed water generating apparatus and a method for generating fine bubble electrolyzed water, the apparatus comprises:

an electrolytic apparatus having a two-chamber structure including an anode chamber with an anode electrode, a cathode chamber with a cathode electrode, and a diaphragm provided between the anode chamber and the cathode chamber, or an electrolytic apparatus having a three-chamber structure including an anode chamber with an anode electrode, a cathode chamber with a cathode electrode, an intermediate chamber provided between these chambers, a diaphragm provided between the anode chamber and the intermediate chamber, and a diaphragm provided between the cathode chamber and the intermediate chamber;

an acidic electrolyzed water storage tank for storing acidic electrolyzed water and an alkaline electrolyzed water storage tank for storing alkaline electrolyzed water, both provided adjacent to the electrolytic apparatus;

pipes through which these electrolyzed water storage tanks are in communication with the anode chamber and the cathode chamber, respectively; and nanobubble generators for generating nanobubbles with gas and liquid, which are in communication with these electrolyzed water storage tanks, respectively, wherein these nanobubble generators generate chlorine nanobubble electrolyzed water with chlorine gas and acidic electrolyzed water produced in the anode chamber, and generate hydrogen nanobubble electrolyzed water with hydrogen gas and alkaline electrolyzed water produced in the cathode chamber.

Advantageous Effects of Invention

According to the present invention, cathode electrolyzed water and excessive hydrogen gas generated at the cathode are supplied to the nanobubble generator in the apparatus. This produces hydrogen nanobubbles in the cathode electrolyzed water to increase the oxidation-reduction potential (ORP) of the cathode electrolyzed water.

In addition, anode electrolyzed water and excessive chlorine gas generated at the anode are supplied to the nanobubble generator in the apparatus. This produces chlorine nanobubbles in the anode electrolyzed water to provide significantly advantageous effects such as increase in chlorine concentration in the anode electrolyzed water.

Furthermore, chlorine nanobubbles are produced in the anode electrolyzed water and nanobubbles are generated in the obtained anode electrolyzed water. This provides fine bubble electrolyzed water having an excellent bactericidal effect.

BRIEF DESCRIPTION OF DRAWINGS

FIG. 9 shows photographs substituted for drawings, illustrating the cleaning effect using the fine bubble electrolyzed water obtained in the present invention, wherein FIG. 9(a) shows an Boston lettuce as an analyte; FIG. 9(b) shows the number of bacteria for an untreated analyte in the case of 100 fold dilution; FIG. 9(c) shows the number of bacteria for an analyte treated with tap water in the case of 100 fold dilution; FIG. 9(d) shows the number of bacteria for an analyte treated with acidic electrolyzed water in the case of 10 fold dilution; and FIG. 9(e) shows the number of bacteria for an analyte treated with nanobubble (NB) acidic electrolyzed water in the case of 10 fold dilution.

DESCRIPTION OF EMBODIMENTS

The present invention will be described below in detail. The present invention is not limited to the following description and can be appropriately modified without departing from the spirit of the present invention.

Figure 1:
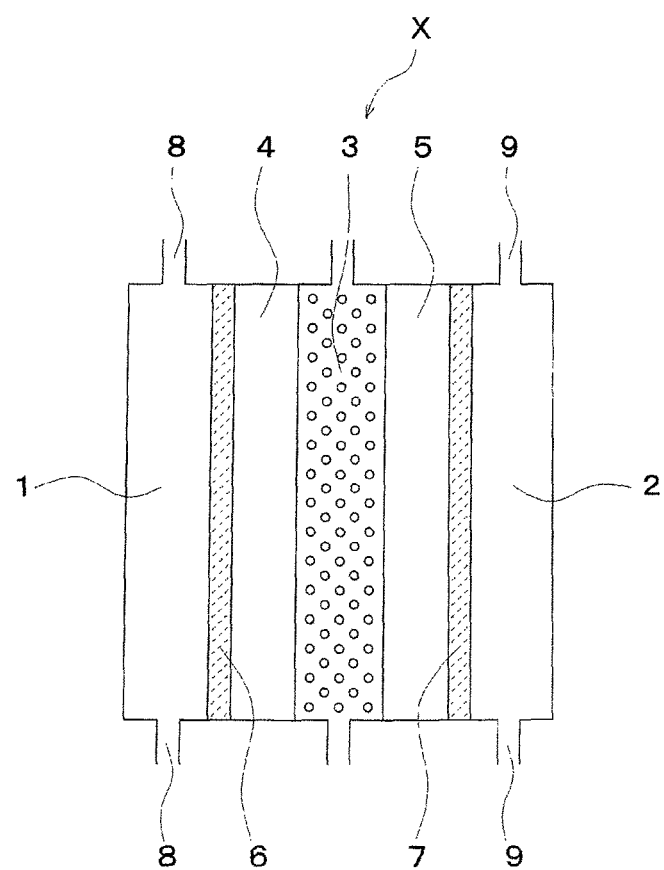
FIG. 1 is a schematic diagram illustrating an embodiment of the electrolytic apparatus used in the present invention.
Figure 2:
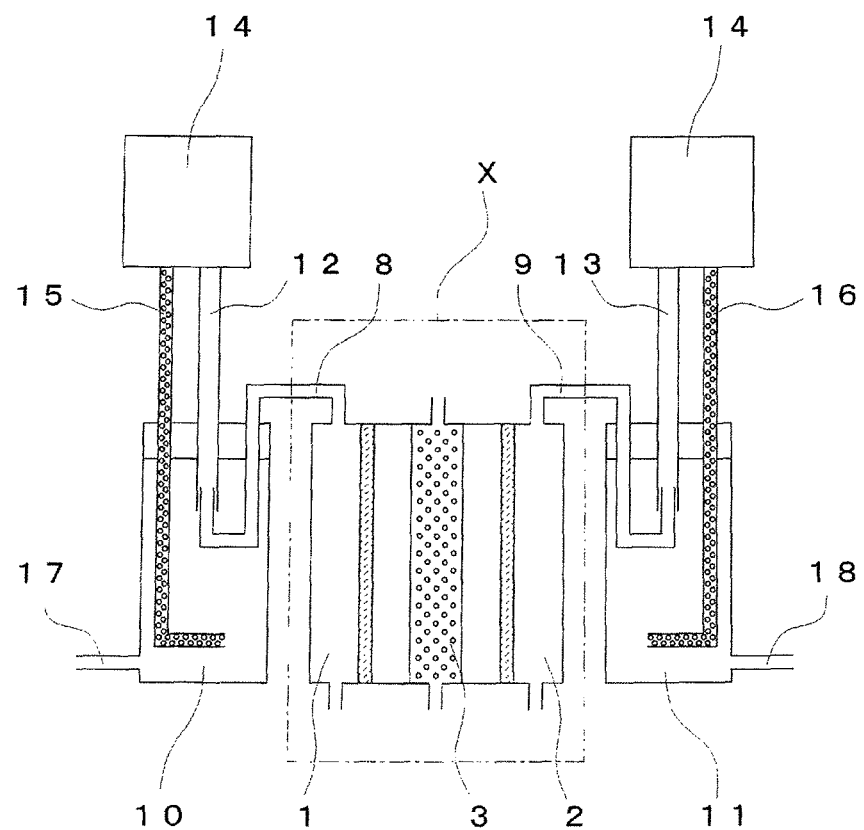
FIG. 2 is a schematic diagram illustrating the condition of use of the fine bubble electrolyzed water generating apparatus used in the present invention.
Figure 3:
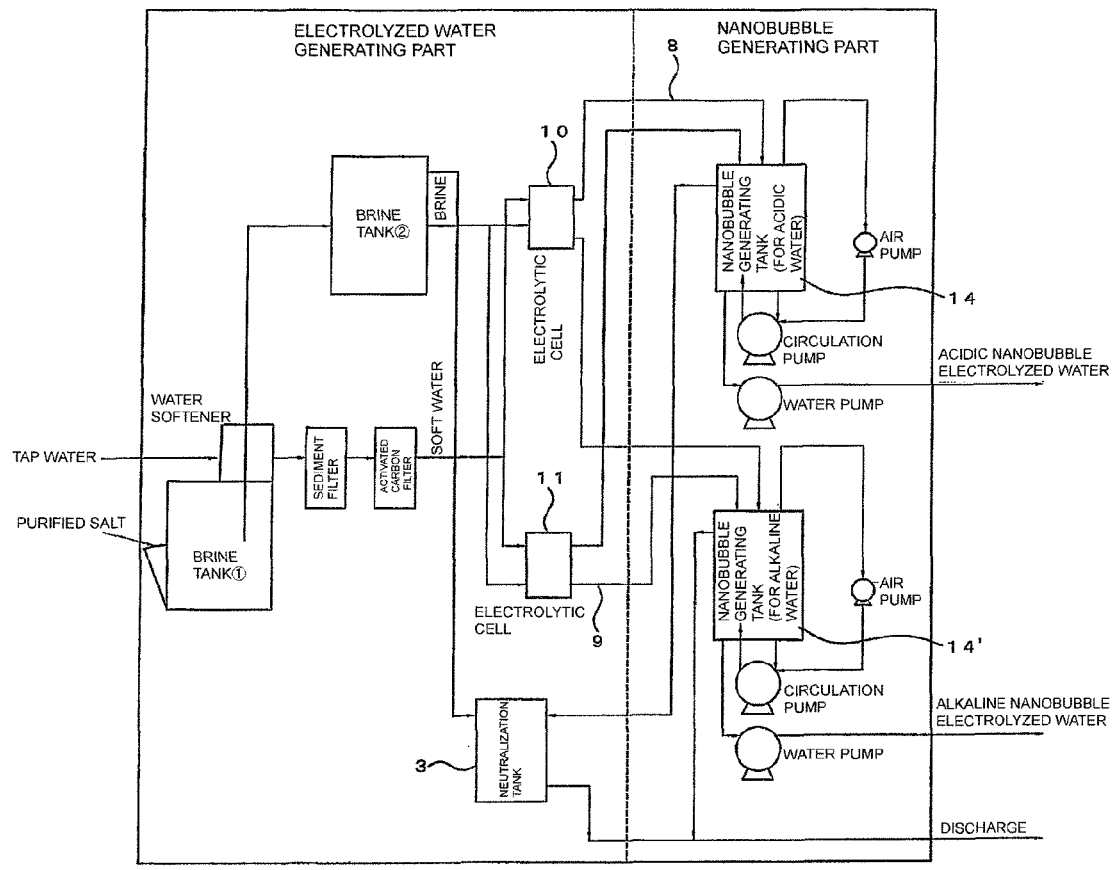
FIG. 3 is a flow chart of the fine bubble electrolyzed water generating apparatus used in the present invention.
Figure 4:
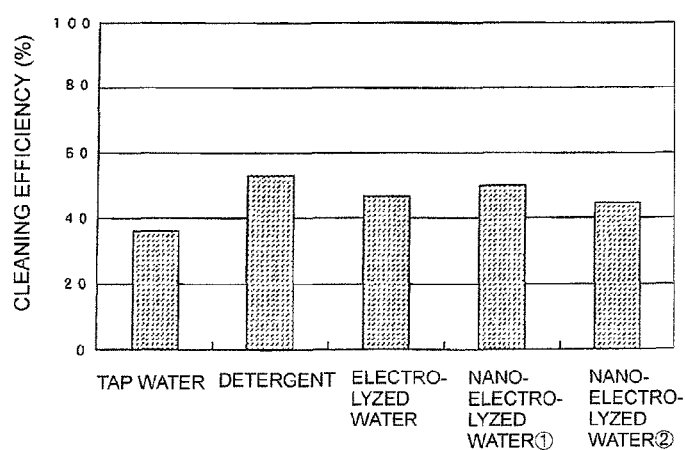
FIG. 4 is a graph showing the cleaning effect using the fine bubble electrolyzed water obtained in the present invention.
Figure 5:
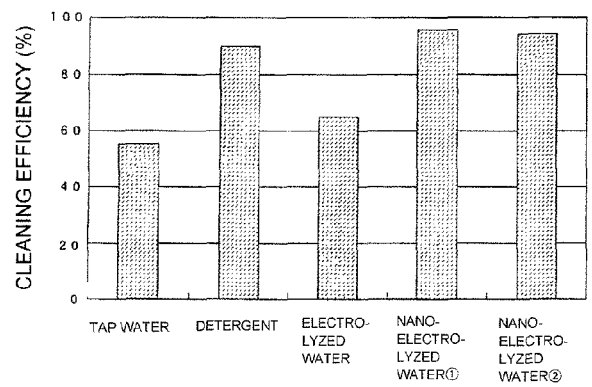
FIG. 5 is a graph showing the cleaning effect using the fine bubble electrolyzed water obtained in the present invention.
Figure 6:
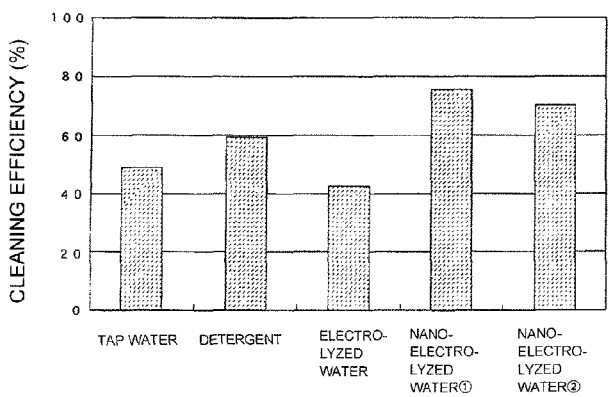
FIG. 6 is a graph showing the cleaning effect using the fine bubble electrolyzed water obtained in the present invention.
Figure 7:
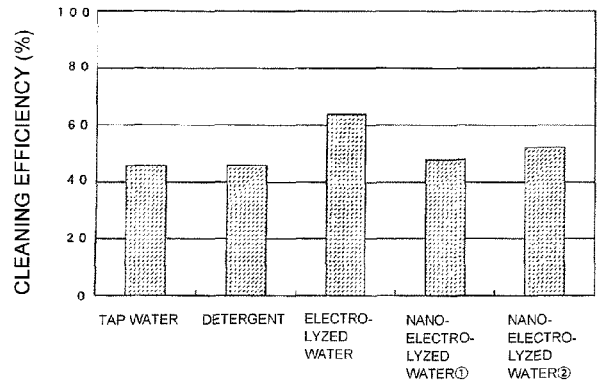
FIG. 7 is a graph showing the cleaning effect using the fine bubble electrolyzed water obtained in the present invention.

An embodiment of the fine bubble electrolyzed water generating apparatus of the present invention will be described with reference to FIGS. 1, 2, and 3. An electrolytic apparatus (X) constituting part of the apparatus has a three-chamber structure, and the three-chamber structure includes an anode chamber (1) with an anode electrode (6), a cathode chamber (2) with a cathode electrode (7), and an intermediate chamber (3) provided between the anode chamber (1) and the cathode chamber (2). The three-chamber structure further includes a diaphragm (4) provided between the anode chamber (1) and the intermediate chamber (3), and a diaphragm (5) provided between the cathode chamber (2) and the intermediate chamber (3).

In the present invention, the electrolytic apparatus (X) is provided with an acidic electrolyzed water storage tank (10) for storing acidic electrolyzed water and a cathode electrolyzed water storage tank (11) for storing alkaline electrolyzed water, both of which are provided close to the anode chamber (1) and the cathode chamber (2) of the apparatus, respectively, and further provided with nanobubble generators (14) and (14) on the anode chamber (1) side and the cathode chamber (2) side, respectively. In addition, pipes (8), (9), (12), (13), (15), and (16) for connecting the chambers (1) and (2), the storage tanks (10) and (11), and the nanobubble generators (14) and (14), and pipes (17) and (18) for discharging from the storage tanks (10) and (11) are provided. Two brine tanks are also provided to supply brine to the anode chamber (1), the cathode chamber (2), and the intermediate chamber (3).

Accordingly, the acidic electrolyzed water generated in the anode chamber (1) of the electrolytic apparatus (X) is in communication with the acidic electrolyzed water storage tank (10) through the acidic electrolyzed water connection pipe (8).

The acidic electrolyzed water storage tank (10) is in communication with the nanobubble generator (14) through the acidic electrolyzed water conduit (12).

Moreover, the nanobubble generator (14) is in communication with the acidic electrolyzed water storage tank (10) through the acidic nanobubble electrolyzed water pipe (15).

The acidic electrolyzed water storage tank (10) is configured so that acidic nanobubble electrolyzed water is discharged through the acidic nanobubble electrolyzed water discharge pipe (17).

The alkaline electrolyzed water generated in the cathode chamber (2) of the electrolytic apparatus (X) is in communication with the alkaline electrolyzed water storage tank (11) through the alkaline electrolyzed water connection pipe (9).

The alkaline electrolyzed water storage tank (11) is in communication with the nanobubble generator (14') through the alkaline electrolyzed water conduit (13).

In addition, the nanobubble generator (14') is in communication with the alkaline electrolyzed water storage tank (11) through the alkaline nanobubble electrolyzed water pipe (16).

The alkaline electrolyzed water storage tank (11) is configured so that alkaline nanobubble electrolyzed water is discharged through the alkaline nanobubble electrolyzed water discharge pipe (18).

According to the present invention, chlorine gas is generated at the anode electrode, and nanobubbles of the chlorine gas are formed and the acidic electrolyzed water including the nanobubbles of the chlorine gas is supplied to the acidic electrolyzed water tank. Furthermore, according to the present invention, hydrogen gas is generated at the cathode electrode, and nanobubbles of the hydrogen gas are formed and the alkaline electrolyzed water including the nanobubbles of the hydrogen gas is supplied to the alkaline electrolyzed water storage tank.

As described above, the electrolytic apparatus used in the fine bubble electrolyzed water generating apparatus has the three-chamber structure including the anode chamber, the intermediate chamber, and the cathode chamber. This electrolytic apparatus may have a two-chamber structure including an anode chamber with an anode electrode, a cathode chamber with a cathode electrode, and a diaphragm provided between these chambers. Alternatively, the electrolytic apparatus may have a one-chamber structure including an anode electrode and a cathode electrode without a diaphragm between these electrodes.

Electrolyzed water generated in the three-chamber type electrolytic cell includes few undissociated electrolytes (for example, salts). The electrolyzed water accordingly has less influence on the operating environment so that the three-chamber type electrolytic cell is more preferable than the two-chamber type electrolytic cell.

Next, an embodiment of the method for generating fine bubble electrolyzed water of the present invention will be described with reference to FIGS. 1 and 2.

First, an aqueous solution of sodium chloride is electrolyzed. Chlorine gas and acidic electrolyzed water generated at the anode electrode in the electrolytic apparatus are processed by the nanobubble generator. This produces chlorine nanobubble electrolyzed water. Hydrogen gas and alkaline electrolyzed water generated at the cathode electrode in the electrolytic apparatus are processed by the nanobubble generator. This produces hydrogen nanobubble electrolyzed water.

In the aqueous solution of sodium chloride used as a raw material of the fine bubble electrolyzed water of the present invention, the concentration of sodium chloride is preferably in the range of 0.05 to 0.2 wt % when the two-chamber type electrolytic cell is used. The aqueous solution of sodium chloride of less than 0.05 wt % is not preferred because the electrolytic efficiency significantly decreases. The aqueous solution of sodium chloride of more than 0.2 wt % is not preferred because undissociated electrolytes remain in the electrolyzed water.

In the three-chamber type electrolytic cell, the aqueous solution of sodium chloride in the intermediate chamber is separated from cathode water and anode water through the diaphragms. Accordingly, there is no movement of sodium chloride to both electrodes. The concentration of the aqueous solution of sodium chloride can be thus controlled by circulating saturated brine, and does not require strict control at a level of several tenths of one percent.

Conventional electrolyzed water and bactericides have hardly reduced the number of residual bacteria or provided the cleaning effect. The fine bubble electrolyzed water of the present invention, however, can reduce the number of residual bacteria and provide the cleaning effect. The fine bubble electrolyzed water of the present invention can be used as, for example, rinsing and sterilizing water in food-processing plants for cut vegetables or others and in cleaning business or other businesses.

EXAMPLES

Next, verification will be made on the cleaning effect of the fine bubble electrolyzed water (hereinafter, referred to as nano-electrolyzed water) generated by this fine bubble electrolyzed water generating apparatus and this method for generating fine bubble electrolyzed water.

Example 1

Content of Test

Saturated brine was electrolyzed using an electrolytic cell having a three-chamber structure under the condition where acidic and alkaline electrolyzed waters were generated at 4 L/min, and the following samples were prepared.

Nano-electrolyzed water 1: a general term for electrolyzed water obtained by forming nanobubbles of gas (hydrogen, chlorine) produced during the generation of electrolyzed water and adding the nanobubbles to the electrolyzed water (alkaline electrolyzed water+hydrogen nanobubbles, acidic electrolyzed water+chlorine nanobubbles)

Nano-electrolyzed water 2: a general term for electrolyzed water obtained by forming nanobubbles of atmosphere and adding the nanobubbles to electrolyzed water (alkaline electrolyzed water+atmosphere nanobubbles, acidic electrolyzed water+atmosphere nanobubbles)

Nano-alkaline electrolyzed water 1: alkaline electrolyzed water obtained by forming nanobubbles of hydrogen gas produced during the generation of alkaline electrolyzed water and adding the nanobubbles to the alkaline electrolyzed water Nano-alkaline electrolyzed water 2: alkaline electrolyzed water obtained by forming nanobubbles of atmosphere and adding the nanobubbles to alkaline electrolyzed water Nano-acidic electrolyzed water 1: acidic electrolyzed water obtained by forming nanobubbles of chlorine gas produced during the generation of acidic electrolyzed water and adding the nanobubbles to the acidic electrolyzed water Nano-acidic electrolyzed water 2: acidic electrolyzed water obtained by forming nanobubbles of atmosphere and adding the nanobubbles to acidic electrolyzed water Electrolyzed water: a general term for water obtained in the anode and cathode chambers by circulating saturated brine in the intermediate chamber of the three-chamber type electrolytic cell for electrolysis Artificially soiled fabrics (produced by EMPA Co.) were washed with the nano-electrolyzed waters to calculate the cleaning efficiency.

As comparative objects, the same tests were performed using tap water, a detergent, and electrolyzed water.

The results were shown in the graphs of FIGS. 3 to 6.

The nano-electrolyzed water 1 (in each table and drawing, expressed by an encircled numeral 1) was prepared by a method in which hydrogen gas produced during the generation of alkaline electrolyzed water was returned to the alkaline electrolyzed water again (at 0.2 L/min for 15 minutes). After washing the fabric with the nano-electrolyzed water 1, the used alkaline electrolyzed water was removed and the fabric was further washed with acidic electrolyzed water (produced chlorine gas was returned thereto (at 0.2 L/min) for 15 minutes).

Subsequently, the fabric was rinsed with tap water. The nano-electrolyzed water 2 (in each table and drawing, expressed by an encircled numeral 2) was alkaline electrolyzed water or acidic electrolyzed water prepared by a method of blowing air (at 0.2 L/min for 15 minutes) instead of gases produced in respective electrolyzed waters. Using this, the fabric was washed with the alkaline electrolyzed water and the acidic electrolyzed water in this order and finally rinsed with tap water.

[Test Method]

Artificially soiled fabrics (five kinds including an unsoiled fabric, carbon black/mineral oil, blood, cocoa, and red wine) having a size of 15 cm square were sewed on towels (64 cm wide×27 cm long) respectively and washed according to the following steps.

In order to reproduce friction between laundry pieces in a tub, the fabric was washed together with nine bath towels (128 cm wide×60 cm long).

A. Order of Washing Process with Tap Water and Detergent (1.→4.)

(Detergent Used) synthetic laundry detergent, Attack bio EX (produced by Kao Corporation)

1. Washing (water temperature: 8° C.) for 15 minutes
  [Condition] water level: low, add 60 g of detergent during washing with detergent
  Temporary dehydration for 1 minute
2. Rinsing (water temperature: 8° C.) for 10 minutes
  [Condition] water level: low
  Temporary dehydration for 1 minute
3. Rinsing 2 (water temperature: 8° C.) for 15 minutes
  [Condition] water level: low
4. Dehydration for 15 minutes B. Order of Washing Process with Electrolyzed Water (Setting for Whites) (1.→4.)

1. Washing with alkaline electrolyzed water (water temperature: 7° C.) for 15 minutes
  [Condition] water level: low, pH: 10.80, ORP: −192, chlorine concentration: 19 ppm
  Temporary dehydration for 1 minute
2. Washing with acidic electrolyzed water (water temperature: 7° C.) for 10 minutes
  [Condition] water level: low, pH: 4.05, chlorine concentration: 19 ppm
  Temporary dehydration for 1 minute
3. Rinsing 2 (water temperature: 6° C.) for 3 minutes
  [Condition] water level: low
4. Dehydration for 5 minutes C. Washing Process with Nano-electrolyzed Water [common in (1) and (2), order (1.→4.)]

1. Washing with nano-alkaline electrolyzed water (water temperature: 7° C.) for 15 minutes
   [Condition] water level: low, pH (1): 12.17, ORP (1): −596
   pH (2): 11.78, ORP (2): −202
   Temporary dehydration for 1 minute
2. Washing with nano-acidic electrolyzed water (water temperature: 6° C.) for 10 minutes
   [Condition] water level: low, pH (1): 4.41, chlorine concentration (1): 18 ppm
   pH (2): 4.40, chlorine concentration (2): 18 ppm
   Temporary dehydration for 1 minute
3. Rinsing (water temperature: 7° C.) for 3 minutes
   [Condition] water level: low
4. Dehydration for 5 minutes

[Instrument Used]
Spectrophotometer: CM-600d (produced by Konica Minolta Sensing, Inc.)
Portable electrical conductivity/pH meter: WM-32EP (produced by DKK-TOA CORPORATION)
ORP combination electrode: PST-2739C (produced by DKK-TOA CORPORATION)
Chlorine meter: RC-2Z (produced by Kasahara Chemical Instruments Co., Ltd.)
Commercial washing machine 22 kg type: WN220 (produced by Yamamoto Manufacturing Co., Ltd.)

[Test Results]
The pH, ORP, and chlorine concentration of the nano-electrolyzed water in the test are shown in Tables 1 and 2.

TABLE 1

VARIOUS VALUES WHEN GENERATING NANO-ALKALINE ELECTROLYZED WATER

| TEST WATER | NANO-ALKALINE ELECTROLYZED WATER① | | NANO-ALKALINE ELECTROLYZED WATER② | |
|---|---|---|---|---|
| | RAW WATER | AFTER PRODUCING NANOBUBBLES | RAW WATER | AFTER PRODUCING NANOBUBBLES |
| pH | 12.04 | 12.17 | 11.89 | 11.78 |
| ORP (mV) | −346 | −596 | −324 | −202 |

Various values in generating the nano-alkaline electrolyzed water are listed in Table 1.

TABLE 2

VARIOUS VALUES WHEN GENERATING NANO-ACDIC ELECTROLYZED WATER

| TEST WATER | NANO-ACIDIC ELECTROLYZED WATER① | | NANO-ACIDIC ELECTROLYZED WATER② | |
|---|---|---|---|---|
| | RAW WATER | AFTER PRODUCING NANO-BUBBLES | RAW WATER | AFTER PRODUCING NANO-BUBBLES |
| pH | 3.73 | 3.77 | 3.73 | 3.75 |
| CHLORINE CONCENTRATION (ppm) | 34 | 51 | 51 | 44 |

* For use in the process with the nano-acidic electrolyzed water, the nano-acidic electrolyzed water was diluted with tap water to have the same chlorine concentration as that in the washing with electrolyzed water.

Various values in generating the nano-acidic electrolyzed water are listed in Table 2.

In Table 2, for use in the process with the nano-acidic electrolyzed water the nano-acidic electrolyzed water was diluted with tap water to have the same chlorine concentration as that in the washing with the electrolyzed water.

After washing the fabric, the reflectance (R) at 520 nm was measured with the spectrophotometer. The K/S value and cleaning efficiency (%) were calculated according to the following formulas.

[Formula]

1. The formula is K/S Value=$[1-\text{Reflectance}(R)]^2/2/\text{Reflectance}(R)$
2. Cleaning Efficiency (%)=[(K/S of Fabric to be Washed)−(K/S of Washed Soiled Fabric)]/[(K/S of Soiled Fabric)−(K/S of Unsoiled Fabric)]×100

TABLE 3

NON-SOILED FABRIC

| | TEST WATER | REFLECTANCE (R) | K/S |
|---|---|---|---|
| NON-SOILED FABRIC (RAW FABRIC) | TAP WATER | 0.7913 | 0.0275 |
| | DETERGENT | 0.7932 | 0.0270 |
| | ELECTROLYZED WATER | 0.7429 | 0.0445 |
| | NANO-ELECTROLYZED WATER① | 0.7920 | 0.0273 |
| | NANO-ELECTROLYZED WATER② | 0.7913 | 0.0275 |

* The reflectance (R) was the average of the measurements for ten times in total on both sides of each soiled fabric.

Table 3 shows the results of the non-soiled fabric. The reflectance (R) is the average of the measurements for ten times in total on both sides of each soiled fabric.

TABLE 4

CARBON BLACK/MINERAL OIL (BEFORE WASHING)

| | TEST WATER (AFTER WASHING) | REFLECTANCE (R) | K/S | CLEANING EFFICIENCY (%) |
|---|---|---|---|---|
| CARBON BLACK/ MINERAL OIL | TAP WATER | 0.3320 | 0.6720 | 37.32 |
| | DETERGENT | 0.3810 | 0.5028 | 54.15 |
| | ELECTROLYZED WATER | 0.3525 | 0.5947 | 47.87 |
| | NANO-ELECTROLYZED WATER① | 0.3690 | 0.5395 | 50.70 |
| | NANO-ELECTROLYZED WATER② | 0.3519 | 0.5968 | 45.97 |

Table 4 shows the results of carbon black/mineral oil (before washing).

TABLE 5

CARBON BLACK/MINERAL OIL (AFTER WASHING)

| | TEST WATER (BEFORE WASHING) | | K/S |
|---|---|---|---|
| CARBON BLACK/ MINERAL OIL | TAP WATER | 0.2596 | 1.0558 |
| | DETERGENT | 0.2583 | 1.0649 |
| | ELECTROLYZED WATER | 0.2534 | 1.0999 |
| | NANO-ELECTROLYZED WATER① | 0.2581 | 1.0663 |

TABLE 5-continued

CARBON BLACK/MINERAL OIL (AFTER WASHING)

| TEST WATER (BEFORE WASHING) | | K/S |
|---|---|---|
| NANO-ELECTROLYZED WATER② | 0.2560 | 1.0811 |

* The cleaning efficiency (%) was indicated in red, orange, and green in order of precedence.

Table 5 shows the results of carbon black/mineral oil (after washing).

TABLE 6

BLOOD (BEFORE WASHING)

| TEST WATER (BEFORE WASHING) | | REFLECTANCE (R) | K/S |
|---|---|---|---|
| BLOOD | TAP WATER | 0.1634 | 2.1417 |
| | DETERGENT | 0.1644 | 2.1236 |
| | ELECTROLYZED WATER | 0.1651 | 2.1110 |
| | NANO-ELECTROLYZED WATER① | 0.1643 | 2.1254 |
| | NANO-ELECTROLYZED WATER② | 0.1634 | 2.1417 |

* The reflectance (R) was the average of the measurements for ten times in total on both sides of each soiled fabric.

Table 6 shows the results of blood (before washing), and the reflectance (R) is the average of the measurements for ten times in total on both sides of each soiled fabric.

TABLE 7

BLOOD (AFTER WASHING)

| TEST WATER (AFTER WASHING) | | REFLECTANCE (R) | K/S | CLEANING EFFICIENCY (%) |
|---|---|---|---|---|
| BLOOD | TAP WATER | 0.2764 | 0.9472 | 56.50 |
| | DETERGENT | 0.5093 | 0.2364 | 90.01 |
| | ELECTROLYZED WATER | 0.3136 | 0.7512 | 65.80 |
| | NANO-ELECTROLYZED WATER① | 0.6643 | 0.0848 | 97.26 |
| | NANO-ELECTROLYZED WATER② | 0.6280 | 0.1102 | 96.09 |

* The reflectance (R) was the average of the measurements for ten times in total on both sides of each soiled fabric.
* The cleaning efficiency (%) was indicated in red, orange, and green in order of precedence.

Table 7 shows the results of blood (after washing).

TABLE 8

COCOA (BEFORE WASHING)

| TEST WATER (BEFORE WASHING) | | REFLECTANCE (R) | K/S |
|---|---|---|---|
| COCOA | TAP WATER | 0.3213 | 0.7168 |
| | DETERGENT | 0.3224 | 0.7121 |
| | ELECTROLYZED WATER | 0.3162 | 0.7394 |
| | NANO-ELECTROLYZED WATER① | 0.3226 | 0.7112 |
| | NANO-ELECTROLYZED WATER② | 0.3176 | 0.7331 |

Table 8 shows the results of cocoa (before washing).

TABLE 9

COCOA (AFTER WASHING)

| TEST WATER (AFTER WASHING) | | REFLECTANCE (R) | K/S | CLEANING EFFICIENCY (%) |
|---|---|---|---|---|
| COCOA | TAP WATER | 0.4347 | 0.3676 | 50.67 |
| | DETERGENT | 0.4658 | 0.3063 | 59.22 |
| | ELECTROLYZED WATER | 0.4020 | 0.4448 | 42.39 |
| | NANO-ELECTROLYZED WATER① | 0.5426 | 0.1928 | 75.80 |
| | NANO-ELECTROLYZED WATER② | 0.5110 | 0.2340 | 70.74 |

Table 9 shows the results of cocoa (after washing).

TABLE 10

RED WINE (BEFORE WASHING)

| TEST WATER (BEFORE WASHING) | | REFLECTANCE (R) | K/S |
|---|---|---|---|
| RED WINE | TAP WATER | 0.4633 | 0.3109 |
| | DETERGENT | 0.4629 | 0.3116 |
| | ELECTROLYZED WATER | 0.4586 | 0.3196 |
| | NANO-ELECTROLYZED WATER① | 0.4620 | 0.3133 |
| | NANO-ELECTROLYZED WATER② | 0.4615 | 0.3142 |

Table 10 shows the results of red wine (before washing).

TABLE 11

RED WINE (AFTER WASHING)

| TEST WATER (AFTER WASHING) | | REFLECTANCE (R) | K/S | CLEANING EFFICIENCY (%) |
|---|---|---|---|---|
| RED WINE | TAP WATER | 0.5553 | 0.1781 | 46.87 |
| | DETERGENT | 0.5569 | 0.1763 | 47.54 |
| | ELECTROLYZED WATER | 0.5923 | 0.1403 | 65.16 |
| | NANO-ELECTROLYZED WATER① | 0.5590 | 0.1740 | 48.72 |
| | NANO-ELECTROLYZED WATER② | 0.5693 | 0.1629 | 52.77 |

Table 11 shows the results of red wine (after washing).

For the fabric to which carbon black dispersed in mineral oil was attached as an artificially soiled fabric, a large difference in detergency was not observed from that of an ordinary detergent. The reason is considered as follows. The mineral oil is emulsified in the washing process by the reaction with a surfactant in the detergent and removed from the fabric. During that time, foams are produced and carbon black is incorporated thereinto as particles.

The nano-electrolyzed water, however, does not function as a surfactant. Free carbon black was accordingly incorporated into a woven fiber along with a part of oil, causing a small reduction in the cleaning effect. This is supposed to be the reason.

Next, for the fabric having blood attached, the entire fabric in which erythrocytes contained in proteins in the blood remain may discolor. When the fabric is washed with the nano-electrolyzed waters prepared by the method of the nano-electrolyzed water 1 and the nano-electrolyzed water 2, the blood incorporated into the fiber may be removed from the fabric by the nano effect. Consequently, the cleaning effect as expected was obtained.

Moreover, cocoa is one of luxury grocery items and includes cacao polyphenols which attract attention from health aspects. These are called antioxidants and have a function of self-protection against the attack of active oxygen.

Cocoa also includes lipid, so that it may be firmly attached to the fiber. Accordingly, it is difficult for tap water, detergents, or others to efficiently remove this kind of lipid incorporated into the woven fiber.

It was found out that the lipid incorporated into the fiber was efficiently removed when the fabric was washed with the nano-electrolyzed water prepared by the method (1) among the nano-electrolyzed waters.

Finally, for washing the fabric to which red wine containing many polyphenols such as flavonoid, anthocyanin, catechin, and tannin is attached, an oxygen bleach is typically used to remove red wine stains. However, an oxygen bleach cannot be used for all textiles.

Red wine includes about 10% to 15% of alcohol. In order to remove polyphenols dissolved in alcohol absorbed into the fiber of the fabric, the oxidation-reduction potential (ORP, unit: mV) of the electrolyzed water must be taken into consideration.

Specifically, a larger positive value of ORP results in a larger oxidizing power (aging) and a larger negative value results in a larger reducing power (anti-aging), increasing its function.

Based on the value of ORP, it was considered that the washing with alkaline electrolyzed water having an ORP value of −192 exerted a high detergency effect. This would be because nanobubbles of the alkaline electrolyzed water were produced by bubbling to increase the ORP value and enhance the reducing power, causing an effect on decrease in cleaning effect.

In this test, verification was made using two kinds of nano-electrolyzed waters. Electrolyzed water (2) is nano-electrolyzed water having air sucked. The ORP value of this nano-electrolyzed water shifted to the positive side as compared with raw water (−596→202 mV). As a result, the detergency of the nano-electrolyzed water 2 was slightly better than that of the nano-electrolyzed water 1.

According to the above results, two kinds of nano-electrolyzed waters prepared are properly used depending on the types of foods that soiled the fabric. This method efficiently confirmed that the washing with the nano-electrolyzed waters had a higher cleaning effect than that of the washing with a conventional detergent.

Next, verification will be made on the bactericidal effect of the nano-electrolyzed water generated by this fine bubble electrolyzed water generating apparatus and this method for generating fine bubble electrolyzed water.

[Content of Test]

Using nano-electrolyzed water, three leaves were randomly taken from a Boston lettuce (commercially available) and one leaf was divided into four parts, each of which was an analyte. The analyte weighted about 8 g. The analyte was lightly washed with water and test water was then sucked up with a bath pump (BP-101K, produced by KOSHIN LTD.) from a sink containing about 50 L test water so that the analyte was washed with running water for two minutes. After the washing, the analyte was lightly washed with water.

The analyte was placed in a sterilization bag. A 10-fold diluted solution is added to the sterilization bag, followed by homogenization for 1 minute. One ml of the obtained analyte solution was dispensed on a simple medium (petrifilm, plate for general viable bacteria, produced by Sumitomo 3M Limited).

Serial dilution was carried out according to the pour plate method. Incubation was carried out under the environment at 35° C. for 48 hours in an incubator. The number of colonies on the medium was counted and the average value of three leaves was obtained as the number of bacteria per g or ml.

The followings were used as test water:
1) tap water;
2) acidic electrolyzed water, pH 3.01, concentration of free residual chlorine: 40 ppm; and
3) nanobubble acidic electrolyzed water, pH 3.05, concentration of free residual chlorine: 40 ppm.

Regarding the generation conditions, an electrolytic water generating apparatus (Mamorumizu: registered trademark) (product number: ESS-ZERO) and a fine bubble generator (NANOAQUA: registered trademark) (product number: MN-20) according to production and distribution by the applicant of the present application are manually connected to each other and continuously operated for 15 minutes. The flow rate of acidic electrolyzed water was about 3 L/min.

[Number of General Viable Bacteria]

The number of bacteria before and after washing a lettuce was counted. A petrifilm for general viable bacteria was used as a medium. Incubation was carried out in an incubator for about 48 hours and the number of colonies was counted. When the average value of three analytes (n=3) was taken and the average value was smaller than that of untreated analytes by two orders, the bactericidal effect would be obtained.

[Results]

Compared with no treatment, the treatments with the nanobubble acidic electrolyzed water and the acidic electrolyzed water demonstrated a reduction in the number of bacteria by two or more orders, showing a significant difference. In particular, the treatment with the nanobubble acidic electrolyzed water showed a reduction in the number of bacteria by four or more orders, which was the most excellent result.

TABLE 12

| | NO TREATMENT | TAP WATER | ACIDIC ELECTRO-LYZED WATER | NANO-BUBBLE ACIDIC ELECTRO-LYZED WATER |
|---|---|---|---|---|
| NUMBER OF GENERAL VIABLE BACTERIA (cfu/ml) | $5.5 \times 10^5$ | $1.5 \times 10^4$ | $8.0 \times 10^3$ | $5.0 \times 10^2$ | n = 3

[Summary]

Figure 8:
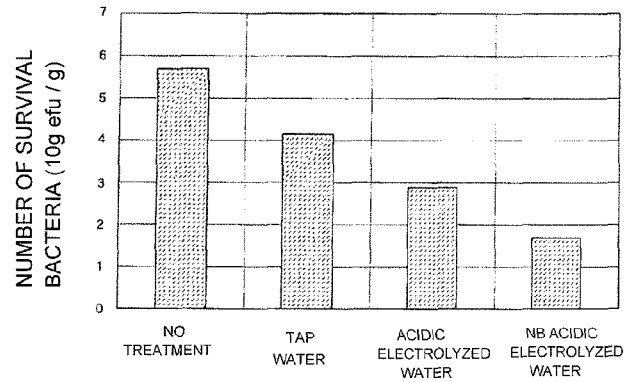
FIG. 8 is a graph showing the cleaning effect using the fine bubble electrolyzed water obtained in the present invention.
Figure 9:
Figure 9:
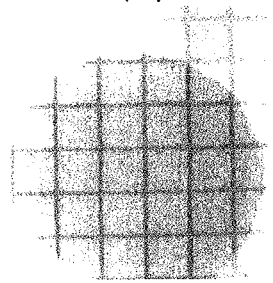
Figure 9:
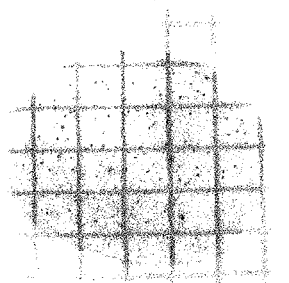
Figure 9:
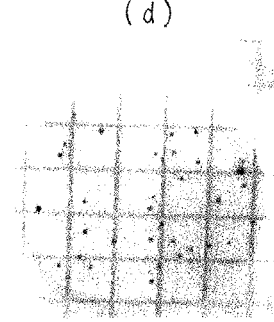
Figure 9:
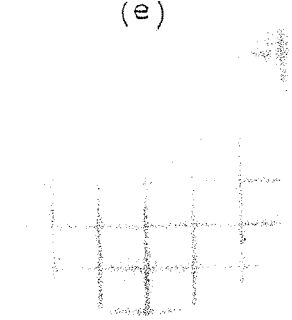

As shown in the above (Table 12) and FIG. 8, the treatment with the nanobubble acidic electrolyzed water demonstrated the largest reduction in the number of general bacteria. This indicated that the nanobubbles were effective for the characteristics (loose leaves are flexible and their thickness is thin.) of the vegetable itself. Furthermore, reproduction and validation or the like have to be succeedingly made on loose leaves. The term "no treatment" means that an analyte of Boston lettuce was purchased but not treated by washing and others.

[Discussion]

As described above, the Boston lettuce was washed with running nanobubble acidic electrolyzed water for 2 minutes.

This successfully eliminated detectable general bacteria. For other leaf vegetables, red leaf lettuce, cabbage and other vegetables were used for preliminary tests but they showed variations in the number of bacteria after the treatments. However, a longer treatment time solved such a problem.

In addition, frilly lettuce provided good results on actual site. This indicated that there was a difference in the effect between head leaf vegetables and loose leaf vegetables among leaf vegetables.

Loose leaves have a more flexible surface, a thinner thickness, and more bacteria attached to the surface than head leaves do. Accordingly, being stirred by washing with running water may allow nanobubbles to easily reach the depths of the vegetables.

The nanobubble generator (14) generates a gas-liquid mixture containing micro-nanobubbles. For example, the generator (14) may be composed utilizing the invention described in Japanese Patent No. 4563496.

INDUSTRIAL APPLICABILITY

The present invention can be industrially applied by establishing the technique of the apparatus and the method for generating the fine bubble electrolyzed water, and manufacturing and distributing the apparatus based on the established technique.

REFERENCE SIGNS LIST

1 Anode chamber
2 Cathode chamber
3 Intermediate chamber
4,5 Diaphragm
6 Anode electrode
7 Cathode electrode
8 Acidic electrolyzed water pipe
9 Alkaline electrolyzed water pipe
10 Acidic electrolyzed water storage tank
11 Alkaline electrolyzed water storage tank
12 Acidic electrolyzed water conduit
13 Alkaline electrolyzed water conduit
14 Nanobubble generator
15 Acidic nanobubble electrolyzed water pipe
16 Alkaline nanobubble electrolyzed water pipe
17 Acidic nanobubble electrolyzed water discharge pipe
18 Alkaline nanobubble electrolyzed water discharge pipe
X Electrolytic apparatus

The invention claimed is:

1. A fine bubble electrolyzed water generating apparatus, comprising:
    an electrolytic apparatus having a three-chamber structure including an anode chamber with an anode electrode, a cathode chamber with a cathode electrode, an intermediate chamber provided between the anode chamber and the cathode chamber, an anode diaphragm provided between the anode chamber and the intermediate chamber, and a cathode diaphragm provided between the cathode chamber and the intermediate chamber;
    an acidic electrolyzed water storage tank that stores acidic electrolyzed water;
    an alkaline electrolyzed water storage tank that stores alkaline electrolyzed water;
    a first pipe through which the anode chamber is in communication with the acidic electrolyzed water storage tank;
    a second pipe through which the cathode chamber is in communication with the alkaline electrolyzed water storage tank;
    a first and second nanobubble generator that generates nanobubbles with gas and liquid, respectively;
    a third pipe through which the acidic electrolyzed water storage tank is in communication with the first nanobubble generator, one end of the third pipe being connected with the first pipe in the acidic electrolyzed water storage tank;
    a fourth pipe through which the first nanobubble generator is in communication with the acidic electrolyzed water storage tank;
    a fifth pipe through which the alkaline electrolyzed water storage tank is in communication with the second nanobubble generator, one end of the fifth pipe being connected with the second pipe in the alkaline electrolyzed water storage tank;
    a sixth pipe through which the second nanobubble generator is in communication with the alkaline electrolyzed water storage tank;
    wherein the first nanobubble generator receives an anode electrolyzed water and chlorine gas generated in the anode chamber through the first and third pipes and generates the nanobubbles with the anode electrolyzed water and the chlorine gas to supply the nanobubbles to the acidic electrolyzed water storage tank through the fourth pipe, and
    wherein the second nanobubble generator receives a cathode electrolyzed water and hydrogen gas generated in the cathode chamber through the second and fifth pipes and generates the nanobubbles with the cathode electrolyzed water and the hydrogen gas to supply the nanobubbles to the alkaline electrolyzed water storage tank through the sixth pipe.

2. The fine bubble electrolyzed water generating apparatus according to claim 1, wherein the fine bubble acidic electrolyzed water containing the nanobubbles generated in the anode electrolyzed water is used for sterilization.

3. The fine bubble electrolyzed water generating apparatus according to claim 1, wherein the third pipe and the fifth pipe are extending in a vertical direction, respectively.

4. A method for generating fine bubble electrolyzed water, comprising:
    electrolyzing an aqueous solution of sodium chloride with an anode electrode and a cathode electrode;
    feeding chlorine gas and acidic electrolyzed water generated at the anode electrode to a first nanobubble generator after feeding the chlorine gas and the acidic electrolyzed water to an acidic electrolyzed water storage tank;
    feeding hydrogen gas and alkaline electrolyzed water generated at the cathode electrode to a second nanobubble generator after feeding the hydrogen gas and the alkaline electrolyzed water to an alkaline electrolyzed water storage tank;
    processing the chlorine gas and the acidic electrolyzed water by the first nanobubble generator to generate chlorine nanobubble electrolyzed water;
    processing the hydrogen gas and the alkaline electrolyzed water by the second nanobubble generator to generate hydrogen nanobubble electrolyzed water;
    feeding the chlorine nanobubble electrolyzed water to the acidic electrolyzed water storage tank through a pipe different from a pipe that feeds the chlorine gas and the acidic electrolyzed water to the first nanobubble generator; and
    feeding the hydrogen nanobubble electrolyzed water to the alkaline electrolyzed water storage tank through a pipe different from a pipe that feeds the hydrogen gas and the alkaline electrolyzed water to the second nanobubble generator.

5. A fine bubble electrolyzed water generating apparatus, comprising:
an electrolytic apparatus having a two-chamber structure including an anode chamber with an anode electrode, a cathode chamber with a cathode electrode, and a diaphragm provided between the anode chamber and the cathode chamber;
an acidic electrolyzed water storage tank that stores acidic electrolyzed water;
an alkaline electrolyzed water storage tank that stores acidic electrolyzed water;
a first pipe through which the anode chamber is in communication with the acidic electrolyzed water storage tank;
a second pipe through which the cathode chamber is in communication with the alkaline electrolyzed water storage tank;
a first and second nanobubble generators that generate nanobubbles with gas and liquid;
a third pipe through which the acidic electrolyzed water storage tank is in communication with the first nanobubble generator, one end of the third pipe being connected with the first pipe in the acidic electrolyzed water storage tank;
a fourth pipe through which the first nanobubble generator is in communication with the acidic electrolyzed water storage tank;
a fifth pipe through which the alkaline electrolyzed water storage tank is in communication with the second nanobubble generator, one end of the fifth pipe being connected with the second pipe in the alkaline electrolyzed water storage tank,
a sixth pipe through which the second nanobubble generator is in communication with the alkaline electrolyzed water storage tank,
wherein the first nanobubble generator receives an anode electrolyzed water and chlorine gas generated in the anode chamber through the first and third pipes and generates the nanobubbles with the anode electrolyzed water and the chlorine gas to supply the nanobubbles to the acidic electrolyzed water storage tank through the fourth pipe, and
the second nanobubble generator receives an cathode electrolyzed water and hydrogen gas generated in the cathode chamber through the second and fifth pipes and generate the nanobubbles with the cathode electrolyzed water and the hydrogen gas to supply the nanobubbles to the alkaline electrolyzed water storage tank through the sixth pipe.

6. The fine bubble electrolyzed water generating apparatus according to claim 5, wherein the third pipe and the fifth pipe are extending in a vertical direction, respectively.

7. A fine bubble electrolyzed water generating apparatus, comprising:
an electrolytic apparatus having a one-chamber structure in which an anode electrode and a cathode electrode are arranged in one chamber;
an electrolyzed water storage tank that stores an electrolyzed water;
a first pipe through which the electrolytic apparatus is in communication with the electrolyzed water storage tank;
a nanobubble generator that generates nanobubbles with gas and liquid;
a second pipe through which the electrolyzed water storage tank is in communication with the nanobubble generator, one end of the second pipe being connected to the first pipe in the electrolyzed water storage tank; and
a third pipe through which the nanobubble generator is in communication with the electrolyzed water storage tank;
wherein the nanobubble generator receives an acidic electrolyzed water and chlorine gas generated by the anode electrode through the first and second pipes and generates the nanobubbles with the acidic electrolyzed water and the chlorine gas to supply the nanobubbles to the electrolyzed water storage tank through the third pipe.

8. The fine bubble electrolyzed water generating apparatus according to claim 7, wherein the second pipe is extending in a vertical direction.

* * * * *